United States Patent
Lyu et al.

(10) Patent No.: US 9,985,770 B2
(45) Date of Patent: May 29, 2018

(54) UPLINK DATA TRANSMISSION METHOD AND APPARATUS

(71) Applicant: HUAWEI TECHNOLOGIES CO., LTD., Shenzhen (CN)

(72) Inventors: Yongxia Lyu, Beijing (CN); Tong Ji, Beijing (CN); Wen Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 93 days.

(21) Appl. No.: 14/858,578

(22) Filed: Sep. 18, 2015

(65) Prior Publication Data
US 2016/0013920 A1    Jan. 14, 2016

Related U.S. Application Data

(63) Continuation of application No. PCT/CN2013/073086, filed on Mar. 22, 2013.

(51) Int. Cl.
| | |
|---|---|
| *H04L 5/00* | (2006.01) |
| *H04W 72/04* | (2009.01) |
| *H04L 27/26* | (2006.01) |

(52) U.S. Cl.
CPC .......... *H04L 5/0064* (2013.01); *H04L 5/0007* (2013.01); *H04L 5/0033* (2013.01); *H04L 5/0046* (2013.01); *H04L 27/2602* (2013.01); *H04W 72/044* (2013.01); *H04W 72/0413* (2013.01)

(58) Field of Classification Search
CPC ... H04L 5/0007; H04L 5/0046; H04L 5/0064; H04L 27/2602; H04W 72/044; H04W 72/0413
See application file for complete search history.

(56) References Cited

U.S. PATENT DOCUMENTS

| | | | |
|---|---|---|---|
| 2003/0043828 A1 | 3/2003 | Wang et al. | |
| 2007/0268812 A1* | 11/2007 | Yoon | H04L 1/0006 370/203 |
| 2009/0185632 A1* | 7/2009 | Cai | H04L 5/0044 375/260 |

(Continued)

FOREIGN PATENT DOCUMENTS

| | | |
|---|---|---|
| CN | 1917491 | 2/2007 |
| CN | 101296229 | 10/2008 |
| CN | 101414902 | 4/2009 |

(Continued)

OTHER PUBLICATIONS

International Search Report dated Dec. 26, 2013 in corresponding international application PCT/CN2013/073086.

(Continued)

*Primary Examiner* — Jae Y Lee
(74) *Attorney, Agent, or Firm* — Staas & Halsey LLP

(57) ABSTRACT

The present invention relates to the field of communications technologies, and provides an uplink data transmission method and apparatus. The method includes: determining a size of a to-be-sent data packet; obtaining a time-frequency resource and a data transmission format that correspond to the size of the to-be-sent data packet; and sending the to-be-sent data packet to a base station on the time-frequency resource according to the data transmission format.

19 Claims, 5 Drawing Sheets

(56) References Cited

U.S. PATENT DOCUMENTS

2013/0176919 A1 7/2013 Pan et al.
2014/0269605 A1* 9/2014 Pecen ................. H04W 56/00
370/330

FOREIGN PATENT DOCUMENTS

WO 03/024033 A1 3/2003
WO 2005/088464 A2 9/2005

OTHER PUBLICATIONS

Office Action, dated Oct. 10, 2016, in Chinese Application No. 201380001760.8 (5 pp.).
Extended European Search Report dated Apr. 21, 2016 in corresponding European Patent Application No. 13878995.3.
"Resource allocation for low bit rate users", 3GPP TSG-RAN WG2 ad-hoc on LTE, Cannes, France, R2-061909, Jun. 27-30, 2006, 3 pages.
"LS on Added Support for 7.5 kHz Subcarrier Spacing", 3GPP TSG RAN WG4 Meeting #42, R4-070017, Feb. 12-16, 2007, 1 page.
"NB-LTE-General L1 Concept Description", 3GPP TSG-RAN WG1 #82bis, Malmo, Sweden, R1-156010, Oct. 5-9, 2015, 16 pages.
Kwon et al. "Multi-Group Random Access Resource Allocation for M2M Devices in Multicell Systems", IEEE Communications Letters, vol. 16, No. 6, Jun. 2012, pp. 834-837.
PCT International Search Report dated Dec. 26, 2013 in corresponding International Patent Application No. PCT/CN2013/073086.
"3rd Generation Partnership Project; Technical Specification Group Radio Access Network; Evolved Universal Terrestrial Radio Access (E-UTRA) Medium Access Control (MAC) protocol specification (Release 8)", 3GPP TS 36.321, V8.4.0, Dec. 2008, pp. 1-43.

* cited by examiner

UPLINK DATA TRANSMISSION METHOD AND APPARATUS

CROSS-REFERENCE TO RELATED APPLICATIONS

This application is a continuation of International Application No. PCT/CN 2013/073086, filed on Mar. 22, 2013, which is hereby incorporated by reference in its entirety.

TECHNICAL FIELD

The present invention relates to the field of communications technologies, and in particular, to an uplink data transmission method and apparatus.

BACKGROUND

At present, when sending uplink data, a terminal first needs to obtain, through a random access process, a time-frequency resource for sending the uplink data, that is, after achieving uplink synchronization, the terminal starts to send the uplink data by using the time-frequency resource.

However, when the existing method is used, if uplink data sent by the terminal is a small data packet, the random access process needs to be performed each time before a small data packet is sent, which leads to a delay in transmission time. Besides, because the random access process generally requires exchange of a dozen pieces of signaling, that is, overheads of a dozen pieces of signaling are occupied each time a small data packet is sent, transmission efficiency is low.

SUMMARY

The present invention provides an uplink data transmission method and apparatus, to reduce a transmission delay when a terminal sends uplink data, and improve transmission efficiency.

In order to achieve the foregoing objective of the present invention, the following technical solutions are used in embodiments of the present invention.

According to a first aspect, an uplink data sending method is provided, including:

determining a size of a to-be-sent data packet;

obtaining a time-frequency resource and a data transmission format that correspond to the size of the to-be-sent data packet, where the data transmission format includes a subcarrier interval used during transmission of the to-be-sent data packet, a quantity of OFDM symbols, and duration of a CP, where a sum of the duration of the CP, duration of N OFDM symbols, and duration of a GT is an integer multiple of a preset transmission timeslot, where N represents the quantity of the OFDM symbols and is a positive integer, and a preset subcarrier interval is an integer multiple of the subcarrier interval; and sending the to-be-sent data packet to a base station on the time-frequency resource according to the data transmission format.

With reference to the first aspect, in a first implementation manner of the first aspect, a design method for the data transmission format is a first data transmission format design method or a second data transmission format design method, where a feature of a data transmission format obtained by using the first data transmission format design method is that a same subcarrier interval is used for data packets of different sizes and data packets of different sizes are transmitted by using different quantities of OFDM symbols; and a feature of a data transmission format obtained by using the second data transmission format design method is that a same quantity of OFDM symbols are used for data packets of different sizes and data packets of different sizes are transmitted by using different subcarrier intervals.

With reference to the first aspect, in a second implementation manner of the first aspect, a value of the CP is greater than or equal to a sum of a maximum multipath delay spread and a double of a propagation delay, and a value of the GT is greater than or equal to the double of the propagation delay.

With reference to either of the foregoing implementation manners of the first aspect, in a third implementation manner of the first aspect, the obtaining a data transmission format corresponding to the size of the to-be-sent data packet includes:

obtaining, according to a preset correspondence between data packets of different sizes and data transmission formats, the data transmission format corresponding to the size of the to-be-sent data packet;

or receiving a correspondence between data packets of different sizes and data transmission formats that is sent by the base station by using dedicated signaling, and obtaining, according to the received correspondence between data packets of different sizes and data transmission formats, the data transmission format corresponding to the size of the to-be-sent data packet.

With reference to any one of the foregoing implementation manners of the first aspect, in a fourth implementation manner of the first aspect, the obtaining a time-frequency resource corresponding to the size of the to-be-sent data packet includes:

receiving a correspondence between data packets of different sizes and time-frequency resources that is broadcast by the base station, and obtaining, according to the received correspondence between data packets of different sizes and time-frequency resources, the time-frequency resource corresponding to the size of the to-be-sent data packet;

or receiving a correspondence between data packets of different sizes and time-frequency resources that is sent by the base station by using dedicated signaling, and obtaining, according to the received correspondence between data packets of different sizes and time-frequency resources, the time-frequency resource corresponding to the size of the to-be-sent data packet.

According to a second aspect, an uplink data receiving method is provided, including:

detecting whether there is a data packet that arrives;

when a data packet is detected, determining a time-frequency resource used for the detected data packet;

obtaining a size of the data packet corresponding to the time-frequency resource, and obtaining a data transmission format corresponding to the size of the data packet, where the data transmission format includes a subcarrier interval used during transmission of the to-be-sent data packet, a quantity of OFDM symbols, and duration of a CP, where a sum of the duration of the CP, duration of N OFDM symbols, and duration of a GT is an integer multiple of a preset transmission timeslot, where N represents the quantity of the OFDM symbols and is a positive integer, and a preset subcarrier interval is an integer multiple of the subcarrier interval; and receiving the data packet on the time-frequency resource according to the data transmission format.

With reference to the second aspect, in a first implementation manner of the second aspect, a design method for the data transmission format is a first data transmission format design method or a second data transmission format design method, where a feature of a data transmission format obtained by using the first data transmission format design method is that a same subcarrier interval is used for data packets of different sizes and data packets of different sizes are transmitted by using different quantities of OFDM symbols; and a feature of a data transmission format obtained by using the second data transmission format design method is that a same quantity of OFDM symbols are used for data packets of different sizes and data packets of different sizes are transmitted by using different subcarrier intervals.

With reference to the second aspect, in a second implementation manner of the second aspect, a value of the CP is greater than or equal to a sum of a maximum multipath delay spread and a double of a propagation delay, and a value of the GT is greater than or equal to the double of the propagation delay.

With reference to either of the foregoing implementation manners of the second aspect, in a third implementation manner of the second aspect, the obtaining a size of the data packet corresponding to the time-frequency resource, and obtaining a data transmission format corresponding to the size of the data packet includes:

obtaining, according to a preset correspondence between sizes of different data packets and time-frequency resources, the size of the data packet corresponding to the time-frequency resource; and obtaining, according to a preset correspondence between data packets of different sizes and data transmission formats, the data transmission format corresponding to the size of the data packet.

With reference to any one of the foregoing implementation manners of the second aspect, in a fourth implementation manner of the second aspect, the method further includes:

sending a correspondence between data packets of different sizes and data transmission formats to a terminal by using dedicated signaling; and broadcasting or sending, by using dedicated signaling, a correspondence between data packets of different sizes and time-frequency resources to the terminal.

According to a third aspect, an uplink data sending apparatus is provided, including:

a determining module, configured to determine a size of a to-be-sent data packet;

an obtaining module, configured to obtain a time-frequency resource and a data transmission format that correspond to the size of the to-be-sent data packet, where the data transmission format includes a subcarrier interval used during transmission of the to-be-sent data packet, a quantity of OFDM symbols, and duration of a CP, where a sum of the duration of the CP, duration of N OFDM symbols, and duration of a GT is an integer multiple of a preset transmission timeslot, where N represents the quantity of the OFDM symbols and is a positive integer, and a preset subcarrier interval is an integer multiple of the subcarrier interval; and a sending module, configured to send the to-be-sent data packet to a base station on the time-frequency resource according to the data transmission format.

With reference to the third aspect, in a first implementation manner of the third aspect, a design method for the data transmission format obtained by the obtaining module is a first data transmission format design method or a second data transmission format design method, where a feature of a data transmission format obtained by using the first data transmission format design method is that a same subcarrier interval is used for data packets of different sizes and data packets of different sizes are transmitted by using different quantities of OFDM symbols; and a feature of a data transmission format obtained by using the second data transmission format design method is that a same quantity of OFDM symbols are used for data packets of different sizes and data packets of different sizes are transmitted by using different subcarrier intervals.

With reference to the third aspect, in a second implementation manner of the third aspect, a value of the CP is greater than or equal to a sum of a maximum multipath delay spread and a double of a propagation delay, and a value of the GT is greater than or equal to the double of the propagation delay.

With reference to either of the foregoing implementation manners of the third aspect, in a third implementation manner of the third aspect, the obtaining module is specifically configured to obtain, according to a preset correspondence between data packets of different sizes and data transmission formats, the data transmission format corresponding to the size of the to-be-sent data packet;

or the obtaining module is specifically configured to receive a correspondence between data packets of different sizes and data transmission formats that is sent by the base station by using dedicated signaling, and obtain, according to the received correspondence between data packets of different sizes and data transmission formats, the data transmission format corresponding to the size of the to-be-sent data packet.

With reference to any one of the foregoing implementation manners of the third aspect, in a fourth implementation manner of the third aspect, the obtaining module is specifically configured to receive a correspondence between data packets of different sizes and time-frequency resources that is broadcast by the base station, and obtain, according to the received correspondence between data packets of different sizes and time-frequency resources, the time-frequency resource corresponding to the size of the to-be-sent data packet;

or the obtaining module is specifically configured to receive a correspondence between data packets of different sizes and time-frequency resources that is sent by the base station by using dedicated signaling, and obtain, according to the received correspondence between data packets of different sizes and time-frequency resources, the time-frequency resource corresponding to the size of the to-be-sent data packet.

According to a fourth aspect, an uplink data receiving apparatus is provided, including:

a detecting module, configured to detect whether there is a data packet that arrives;

a determining module, configured to: when a data packet is detected, determine a time-frequency resource used for the detected data packet;

an obtaining module, configured to obtain a size of the data packet corresponding to the time-frequency resource, and obtain a data transmission format corresponding to the size of the data packet, where the data transmission format includes a subcarrier interval used during transmission of the to-be-sent data packet, a quantity of OFDM symbols, and duration of a CP, where a sum of the duration of the CP, duration of N OFDM symbols, and duration of a GT is an integer multiple of a preset transmission timeslot, where N represents the quantity of the OFDM symbols and is a positive integer, and a preset subcarrier interval is an integer multiple of the subcarrier interval; and a receiving module, configured to receive the data packet on the time-frequency resource according to the data transmission format.

With reference to the fourth aspect, in a first implementation manner of the fourth aspect, a design method for the data transmission format is a first data transmission format design method or a second data transmission format design method, where a feature of a data transmission format obtained by using the first data transmission format design method is that a same subcarrier interval is used for data packets of different sizes and data packets of different sizes are transmitted by using different quantities of OFDM symbols; and a feature of a data transmission format obtained by using the second data transmission format design method is that a same quantity of OFDM symbols are used for data packets of different sizes and data packets of different sizes are transmitted by using different subcarrier intervals.

With reference to the fourth aspect, in a second implementation manner of the fourth aspect, a value of the CP is greater than or equal to a sum of a maximum multipath delay spread and a double of a propagation delay, and a value of the GT is greater than or equal to the double of the propagation delay.

With reference to either of the foregoing implementation manners of the fourth aspect, in a third implementation manner of the fourth aspect, the obtaining module is specifically configured to obtain, according to a preset correspondence between sizes of different data packets and time-frequency resources, the size of the data packet corresponding to the time-frequency resource; and the obtaining module is specifically further configured to obtain, according to a preset correspondence between data packets of different sizes and data transmission formats, the data transmission format corresponding to the size of the data packet.

With reference to any one of the foregoing implementation manners of the fourth aspect, in a fourth implementation manner of the fourth aspect, the apparatus further includes:

a sending module, configured to send a correspondence between data packets of different sizes and data transmission formats to a terminal by using dedicated signaling, where the sending module is further configured to broadcast or send, by using dedicated signaling, a correspondence between data packets of different sizes and time-frequency resources to the terminal.

According to a fifth aspect, an uplink data sending apparatus is provided, including:

a processor, configured to determine a size of a to-be-sent data packet, where the processor is further configured to obtain a time-frequency resource and a data transmission format that correspond to the size of the to-be-sent data packet, where the data transmission format includes a subcarrier interval used during transmission of the to-be-sent data packet, a quantity of OFDM symbols, and duration of a CP, where a sum of the duration of the CP, duration of N OFDM symbols, and duration of a GT is an integer multiple of a preset transmission timeslot, where N represents the quantity of the OFDM symbols and is a positive integer, and a preset subcarrier interval is an integer multiple of the subcarrier interval; and a transmitter, configured to send the to-be-sent data packet to a base station on the time-frequency resource according to the data transmission format.

With reference to the fifth aspect, in a first implementation manner of the fifth aspect, a design method for the data transmission format is a first data transmission format design method or a second data transmission format design method, where a feature of a data transmission format obtained by using the first data transmission format design method is that a same subcarrier interval is used for data packets of different sizes and data packets of different sizes are transmitted by using different quantities of OFDM symbols; and a feature of a data transmission format obtained by using the second data transmission format design method is that a same quantity of OFDM symbols are used for data packets of different sizes and data packets of different sizes are transmitted by using different subcarrier intervals.

With reference to the fifth aspect, in a second implementation manner of the fifth aspect, a value of the CP is greater than or equal to a sum of a maximum multipath delay spread and a double of a propagation delay, and a value of the GT is greater than or equal to the double of the propagation delay.

With reference to either of the foregoing implementation manners of the fifth aspect, in a third implementation manner of the fifth aspect, the processor is specifically configured to obtain, according to a preset correspondence between data packets of different sizes and data transmission formats, the data transmission format corresponding to the size of the to-be-sent data packet;

or the apparatus further includes: a receiver, configured to receive a correspondence between data packets of different sizes and data transmission formats that is sent by the base station by using dedicated signaling, where the processor is specifically configured to obtain, according to the correspondence between data packets of different sizes and data transmission formats that is received by the receiver, the data transmission format corresponding to the size of the to-be-sent data packet.

With reference to any one of the foregoing implementation manners of the fifth aspect, in a fourth implementation manner of the fifth aspect, the apparatus further includes:

a receiver, configured to receive a correspondence between data packets of different sizes and time-frequency resources that is broadcast by the base station, where the processor is specifically configured to obtain, according to the received correspondence between data packets of different sizes and time-frequency resources, the time-frequency resource corresponding to the size of the to-be-sent data packet;

or the receiver, specifically configured to receive a correspondence between data packets of different sizes and time-frequency resources that is sent by the base station by using dedicated signaling, where the processor is specifically configured to obtain, according to the received correspondence between data packets of different sizes and time-frequency resources, the time-frequency resource corresponding to the size of the to-be-sent data packet.

According to a sixth aspect, an uplink data receiving apparatus is provided, including:

a processor, configured to detect whether there is a data packet that arrives, where the processor is further configured to: when a data packet is detected, determine a time-frequency resource used for the detected data packet; and the processor is further configured to obtain a size of the data packet corresponding to the time-frequency resource, and obtain a data transmission format corresponding to the size of the data packet, where the data transmission format includes a subcarrier interval used during transmission of the to-be-sent data packet, a quantity of OFDM symbols, and duration of a CP, where a sum of the duration of the CP, duration of N OFDM symbols, and duration of a GT is an integer multiple of a preset transmission timeslot, where N represents the quantity of the OFDM symbols and is a positive integer, and a preset subcarrier interval is an integer multiple of the subcarrier interval; and a receiver, configured to receive the data packet on the time-frequency resource according to the data transmission format.

With reference to the sixth aspect, in a first implementation manner of the sixth aspect, a design method for the data transmission format is a first data transmission format design method or a second data transmission format design method, where a feature of a data transmission format obtained by using the first data transmission format design method is that a same subcarrier interval is used for data packets of different sizes and data packets of different sizes are transmitted by using different quantities of OFDM symbols; and a feature of a data transmission format obtained by using the second data transmission format design method is that a same quantity of OFDM symbols are used for data packets of different sizes and data packets of different sizes are transmitted by using different subcarrier intervals.

With reference to the sixth aspect, in a second implementation manner of the sixth aspect, a value of the CP is greater than or equal to a sum of a maximum multipath delay spread and a double of a propagation delay, and a value of the GT is greater than or equal to the double of the propagation delay.

With reference to either of the foregoing implementation manners of the sixth aspect, in a third implementation manner of the sixth aspect, the processor is specifically configured to obtain, according to a preset correspondence between sizes of different data packets and time-frequency resources, the size of the data packet corresponding to the time-frequency resource; and the processor is specifically further configured to obtain, according to a preset correspondence between data packets of different sizes and data transmission formats, the data transmission format corresponding to the size of the data packet.

With reference to any one of the foregoing implementation manners of the sixth aspect, in a fourth implementation manner of the sixth aspect, the apparatus further includes:

a transmitter, configured to send a correspondence between data packets of different sizes and data transmission formats to a terminal by using dedicated signaling, where the transmitter is further configured to broadcast or send, by using dedicated signaling, a correspondence between data packets of different sizes and time-frequency resources to the terminal.

In the embodiments of the present invention, when sending uplink data, a terminal obtains a time-frequency resource and a data transmission format that correspond to a size of a to-be-sent data packet, and sends the to-be-sent data packet to a base station on the time-frequency resource according to the data transmission format. Compared with the prior art, in the present invention, the terminal does not need to perform a random access process before sending the uplink data, and instead sends the uplink data directly to the base station on the time-frequency resource according to the obtained data transmission format; therefore, especially when the uplink data is a small data packet, a transmission delay during sending of the uplink data by the terminal can be reduced and transmission efficiency can be improved.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
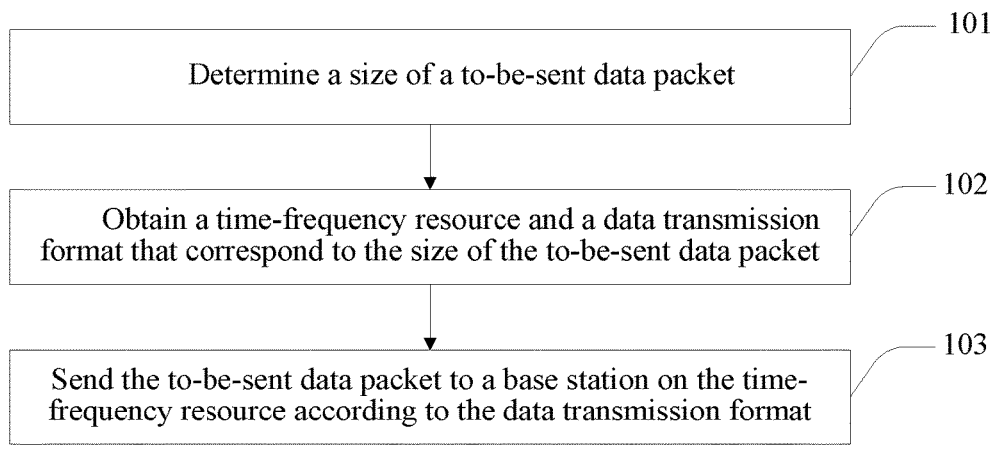
FIG. 1 is a flowchart of an uplink data sending method according to an embodiment of the present invention.

As shown in FIG. 1, an embodiment of the present invention provides an uplink data sending method. The method may be executed by a terminal and includes:

101: Determine a size of a to-be-sent data packet.

In this embodiment of the present invention, the to-be-sent data packet is a data packet having a small capacity. For example, the size of the to-be-sent data packet may be 20 bytes (byte), 30 bytes, 40 bytes, 50 bytes, or the like.

It should be noted that the to-be-sent data packet is a data packet of a pre-designed standard size. All data to be actually sent by the terminal needs to be sent by using a data packet of the standard size, where the data packet of the standard size may be a 20 bytes data packet, a 30 bytes data packet, a 40 bytes data packet, a 50 bytes data packet, or the like.

It can be understood that the size of the to-be-sent data packet is not a size of all the data to be sent by the terminal. All the data to be actually sent by the terminal needs to be converted into a data packet of the standard size for sending.

For example, the size of all the data to be actually sent by the terminal may be 1 Kbyte, and the 1-Kbyte data may be sent by using several 20 bytes data packets, or may be sent by using several 30 bytes data packets, or may be sent by using several 40 bytes data packets and several 50 bytes data packets together, which is not limited herein.

102: Obtain a time-frequency resource and a data transmission format that correspond to the size of the to-be-sent data packet.

The time-frequency resource is a timeslot resource and a frequency resource that are used during transmission of the to-be-sent data packet, and is pre-allocated by a base station and notified by the base station to the terminal. After obtaining the time-frequency resource, the terminal may send the to-be-sent data packet to the base station on a timeslot and a frequency that are indicated by the time-frequency resource.

It should be noted that in a Long Term Evolution (LTE) system, duration of one data frame is 10 milliseconds (ms), one data frame includes 10 subframes, duration of each subframe is 1 ms, each subframe includes two timeslots, duration of each timeslot is 0.5 ms, and each timeslot can be used to send 7 orthogonal frequency division multiplexing (OFDM) symbols.

In the existing LTE system, one section of continuous frequencies corresponds to one subcarrier.

Therefore, the timeslot resource in the time-frequency resource may be specifically represented by a certain OFDM symbol of a certain timeslot of the $y^{th}$ subframe of the $x^{th}$ data frame, and the frequency resource may be specifically represented by a frequency or a subcarrier.

In this embodiment of the present invention, a specific implementation of the obtaining a time-frequency resource corresponding to the size of the to-be-sent data packet is as follows:

optionally, it may be: receiving, by the terminal, a correspondence between data packets of different sizes and time-frequency resources that is broadcast by the base station, and obtaining, according to the received correspondence between data packets of different sizes and time-frequency resources, the time-frequency resource corresponding to the size of the to-be-sent data packet;

or optionally, it may also be: receiving, by the terminal, a correspondence between data packets of different sizes and time-frequency resources that is sent by the base station by using dedicated signaling, and obtaining, according to the received correspondence between data packets of different sizes and time-frequency resources, the time-frequency resource corresponding to the size of the to-be-sent data packet.

Data packets of different sizes separately correspond to different time-frequency resources, that is, a data packet of each size has a uniquely corresponding time-frequency resource.

Further, in this embodiment of the present invention, the data transmission format includes a subcarrier interval used during transmission of the to-be-sent data packet, a quantity of subcarriers, a quantity of OFDM symbols, and duration of a cyclic prefix (CP), duration of a single OFDM symbol, and duration of a guard time (GT).

Before sending a data packet, the terminal modulates the data packet into several OFDM symbols according to a preset modulation scheme (for example, a quadrature phase shift keying (QPSK) modulation scheme), and sends these OFDM symbols by using a timeslot resource corresponding to the data packet, that is, sends these OFDM symbols on a corresponding timeslot and frequency (or a subcarrier, because one subcarrier corresponds to one section of continuous frequencies, a corresponding subcarrier may be determined according to a specific frequency).

Therefore, it can be understood that the subcarrier interval and the quantity of the subcarriers define a transmission format in a frequency domain after the to-be-sent data packet is modulated into the OFDM symbols, where a preset subcarrier interval is an integer multiple of the subcarrier interval.

For example, the preset subcarrier interval may be a subcarrier interval in the existing LTE system, and the subcarrier interval in the existing LTE system is 15 KHZ.

In the data transmission format provided in this embodiment of the present invention, the subcarrier interval in the existing LTE system may be an integer multiple of the subcarrier interval provided in this embodiment of the present invention. Therefore, interference between a subcarrier used in this embodiment of the present invention and a subcarrier in the existing LTE system can be reduced effectively, and reliability of data transmission can be improved.

Similarly, it can be understood that the quantity of the OFDM symbols, the duration of the CP, the duration of a single OFDM symbol, and the duration of the GT together define a transmission format in a time domain after the to-be-sent data packet is modulated into the OFDM symbols.

Figure 2:
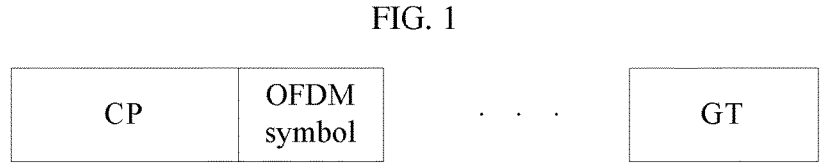
FIG. 2 is a schematic diagram of a transmission format in a time domain after a data packet is modulated into OFDM symbols according to an embodiment of the present invention.

As shown in FIG. 2, which is a schematic diagram of a transmission format in a time domain after a data packet is modulated into OFDM symbols according to an embodiment of the present invention, a CP, N OFDM symbols, and a GT are specifically included.

A sum of duration of the CP, duration of the N OFDM symbols, and duration of the GT is an integer multiple of a preset transmission timeslot, where N represents a quantity of the OFDM symbols and is a positive integer.

For example, the preset transmission timeslot may be a timeslot in LTE. In LTE, one subframe of one data frame has duration of 1 millisecond (ms) in a time domain and includes two timeslots, and each timeslot is 500 microseconds (µs). Therefore, in this embodiment of the present invention, the sum of the duration of the CP, the duration of the N OFDM symbols, and the duration of the GT is an integer multiple of 500 µs.

A value of the CP is greater than or equal to a sum of a maximum multipath delay spread and a double of a propagation delay, and a value of the GT is greater than or equal to the double of the propagation delay.

Because lengths of paths are different, arrival times of signals are different. If a base station sends a pulse signal, a received signal not only includes the signal, but also includes delayed signals of the signal. Such a phenomenon in which a pulse width of a received signal is spread due to a multipath effect is referred to as a delay spread.

The maximum multipath delay spread is defined as a difference between a maximum transmission delay and a minimum transmission delay, that is, a difference between arrival times of the last distinguishable delayed signal and the first delayed signal, and the propagation delay refers to a ratio of a distance between a terminal and a base station to a speed of light.

It should be noted that in the transmission format shown in FIG. 2, the CP, the N OFDM symbols, and the GT also form a data frame, and the GT can reduce interference from a subsequent subframe.

Further, data packets of different sizes correspond to different data transmission formats. In this embodiment of the present invention, the following two transmission formats are provided, so as to implement transmission of data packets of different sizes.

Specifically, a design method for the data transmission format is a first data transmission format design method or a second data transmission format design method, where a feature of a data transmission format obtained by using the first data transmission format design method is that a same subcarrier interval is used for data packets of different sizes and data packets of different sizes are transmitted by using different quantities of OFDM symbols.

For example, a same subcarrier interval is used for transmitting all data packets, and because a reciprocal of a subcarrier interval is OFDM symbol duration, it may be that same OFDM symbol duration is used for all data packets; and a data packet of a smaller size may be transmitted by using one OFDM symbol, and a data packet of a larger size may be transmitted by using two or more OFDM symbols.

As shown in Table 1 that shows data transmission formats obtained by using the first data transmission format design method, data transmission formats corresponding to data packets of four sizes are listed, and each row represents a data transmission format corresponding to a data packet of one size.

Using an example in which a bandwidth used to transmit a data packet is 1.4 M, a bandwidth actually used to transmit data may be 1.05 M;

a subcarrier interval is 2.5 KHZ, and a subcarrier interval in the existing LTE system is 15 KHZ, and because 15/2.5=6, the requirement that the preset subcarrier interval is an integer multiple of the subcarrier interval is satisfied;

the subcarrier interval of 2.5 KHZ is used for all of the 20 bytes data packet, the 30 bytes data packet, the 40 bytes data packet, and the 50 bytes data packet;

the 20 bytes data packet is transmitted by using one OFDM symbol, and a transmission format corresponding to the 20 bytes data packet is shown in row 1 of Table 1, where a sum of duration of the CP, duration of one OFDM symbol, and duration of the GT is 55+400+45=500 μs, which is exactly an integer multiple of one timeslot in the existing LTE system;

the 30 bytes data packet is also transmitted by using one OFDM symbol, and a transmission format corresponding to the 30 bytes data packet is shown in row 2 of Table 1, where a sum of duration of the CP, duration of one OFDM symbol, and duration of the GT is 55+400+45=500 μs, which is exactly an integer multiple of one timeslot in the existing LTE system;

the 40 bytes data packet is transmitted by using two OFDM symbols, and a transmission format corresponding to the 40 bytes data packet is shown in row 3 of Table 1, where a sum of duration of the CP, duration of two OFDM symbols, and duration of the GT is 105+400*2+95=1000 μs, which is also exactly an integer multiple of one timeslot in the existing LTE system; and the 50 bytes data packet is also transmitted by using two OFDM symbols, and a transmission format corresponding to the 50 bytes data packet is shown in row 4 of Table 1, where a sum of duration of the CP, duration of two OFDM symbols, and duration of the GT is 105+400*2+95=1000 μs, which is also exactly an integer multiple of one timeslot in the existing LTE system.

TABLE 1

| Size of a data packet | Bandwidth | Subcarrier interval (Hz) | Quantity of subcarriers | Quantity of OFDM symbols | Bandwidth (Hz) required by data | Duration (μs) of a CP | Duration (μs) of a symbol | Duration (μs) of a GT |
|---|---|---|---|---|---|---|---|---|
| 20 bytes | 1.4M | 2.5K | 420 | 1 | 1.05M | 55 | 400 | 45 |
| 30 bytes | 1.4M | 2.5K | 420 | 1 | 1.05M | 55 | 400 | 45 |
| 40 bytes | 1.4M | 2.5K | 420 | 2 | 1.05M | 105 | 400 | 95 |
| 50 bytes | 1.4M | 2.5K | 420 | 2 | 1.05M | 105 | 400 | 95 |

A feature of a data transmission format obtained by using the second data transmission format design method is that a same quantity of OFDM symbols are used for data packets of different sizes and data packets of different sizes are transmitted by using different subcarrier intervals.

For example, all data packets are transmitted by using one OFDM symbol; and a data packet of a smaller size may be transmitted by using a larger subcarrier interval, and a data packet of a larger size may be transmitted by using a smaller subcarrier interval.

As shown in Table 2 that shows data transmission formats obtained by using the second data transmission format design method, data transmission formats corresponding to data packets of four sizes are listed, and each row represents a data transmission format corresponding to a data packet of one size.

Using an example in which a bandwidth used to transmit a data packet is 1.4 M, a bandwidth actually used to transmit data may be 1.05 M;

one OFDM symbol is used for all the 20 bytes data packet, the 30 bytes data packet, the 40 bytes data packet, and the 50 bytes data packet;

a transmission format corresponding to the 20 bytes data packet is shown in row 1 of Table 2, where a subcarrier interval of 3 KHZ is used for transmission, and because 15/3=5, the requirement that the preset subcarrier interval is an integer multiple of the subcarrier interval is satisfied; and a sum of duration of the CP, duration of one OFDM symbol, and duration of the GT is 86+333+81=500 µs, which is exactly an integer multiple of one timeslot in the existing LTE system;

a transmission format corresponding to the 30 bytes data packet is shown in row 2 of Table 2, where a subcarrier interval of 3 KHZ is also used for transmission, and because 15/3=5, the requirement that the preset subcarrier interval is an integer multiple of the subcarrier interval is satisfied; and a sum of duration of the CP, duration of one OFDM symbol, and duration of the GT is 86+333+81=500 µs, which is exactly an integer multiple of one timeslot in the existing LTE system;

a transmission format corresponding to the 40 bytes data packet is shown in row 3 of Table 2, where a subcarrier interval of 3 KHZ is used for transmission, and because 15/2.5=6, the requirement that the preset subcarrier interval is an integer multiple of the subcarrier interval is satisfied; and a sum of duration of the CP, duration of one OFDM symbol, and duration of the GT is 55+400+45=500 µs, which is exactly an integer multiple of one timeslot in the existing LTE system; and a transmission format corresponding to the 50 bytes data packet is shown in row 4 of Table 2, where a subcarrier interval of 3 KHZ is used for transmission, and because 15/2.5=6, the requirement that the preset subcarrier interval is an integer multiple of the subcarrier interval is satisfied; and a sum of duration of the CP, duration of one OFDM symbol, and duration of the GT is 55+400+45=500 µs, which is exactly an integer multiple of one timeslot in the existing LTE system.

that is sent by the base station by using dedicated signaling, and obtaining, according to the received correspondence between data packets of different sizes and data transmission formats, the data transmission format corresponding to the size of the to-be-sent data packet.

It should be noted that in this embodiment of the present invention, sizes of data packets, time-frequency resources, and data transmission formats have a one-to-one correspondence.

103: Send the to-be-sent data packet to a base station on the time-frequency resource according to the data transmission format.

For example, using an example in which the size of the to-be-sent data packet is 20 bytes, the terminal may modulate the 20 bytes data packet into 240 OFDM symbols by using the QPSK modulation scheme; using an example in which a transmission format corresponding to the 20 bytes data packet is the transmission format shown in row 1 of Table 1, one OFDM symbol is used; and if the time-frequency resource corresponding to the 20 bytes data packet is the second OFDM symbol of the first timeslot of the second subframe of the third data frame and 240 specified subcarriers, the terminal uses the 240 subcarriers (the subcarrier interval is 2.5 KHZ) to send the 240 OFDM symbols within duration of the second OFDM symbol of the first timeslot of the second subframe of the third data frame.

In this embodiment of the present invention, when sending uplink data, a terminal obtains a time-frequency resource and a data transmission format that correspond to a size of a to-be-sent data packet, and sends the to-be-sent data packet to a base station on the time-frequency resource according to the data transmission format. Compared with the prior art, in the present invention, the terminal does not need to perform a random access process before sending the uplink data, and

TABLE 2

| Size of a data packet | Bandwidth (Hz) | Subcarrier interval | Quantity of subcarriers | Quantity of OFDM symbols | Bandwidth (Hz) required by data | Duration (µs) of a CP | Duration (µs) of a symbol | Duration (µs) of a GT |
|---|---|---|---|---|---|---|---|---|
| 20 bytes | 1.4M | 3K | 350 | 1 | 1.05M | 86 | 333 | 81 |
| 30 bytes | 1.4M | 3K | 350 | 1 | 1.05M | 86 | 333 | 81 |
| 40 bytes | 1.4M | 2.5K | 420 | 1 | 1.05M | 55 | 400 | 45 |
| 50 bytes | 1.4M | 2.5K | 420 | 1 | 1.05M | 55 | 400 | 45 |

It should be noted that in this embodiment of the present invention, the sizes of data packets, the bandwidths, the subcarrier intervals, the quantities of subcarriers, the quantities of OFDM symbols, the durations of CPs, the duration of a single OFDM symbol, the durations of GTs, and the like that are mentioned above are all examples according to an existing LTE solution, but the present invention is not limited to the described specific values; if the values are changed into other values, modifications may be made correspondingly according to corresponding principles.

Further, in this embodiment of the present invention, the obtaining a data transmission format corresponding to the size of the to-be-sent data packet may be implemented in the following manner:

optionally, it may be: obtaining, according to a preset correspondence between data packets of different sizes and data transmission formats, the data transmission format corresponding to the size of the to-be-sent data packet; or optionally, it may be: receiving a correspondence between data packets of different sizes and data transmission formats instead sends the uplink data directly to the base station on the time-frequency resource according to the obtained data transmission format; therefore, especially when the uplink data is a small data packet, a transmission delay during sending of the uplink data by the terminal can be reduced and transmission efficiency can be improved.

Figure 3:
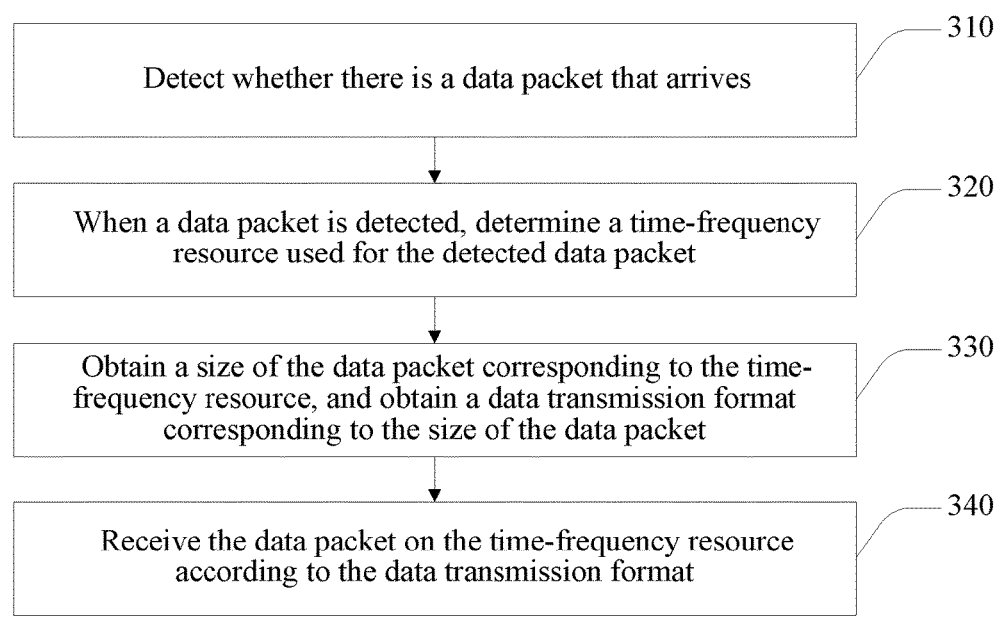
FIG. 3 is a flowchart of an uplink data receiving method according to an embodiment of the present invention.

As shown in FIG. 3, an embodiment of the present invention provides an uplink data receiving method. The method is executed by a base station and includes:

310: Detect whether there is a data packet that arrives.

320: When a data packet is detected, determine a time-frequency resource used for the detected data packet.

330: Obtain a size of the data packet corresponding to the time-frequency resource, and obtain a data transmission format corresponding to the size of the data packet.

The time-frequency resource is a timeslot resource and a frequency resource that are used during transmission of the to-be-sent data packet, and is pre-allocated by a base station and notified by the base station to the terminal. After obtaining the time-frequency resource, the terminal may send the to-be-sent data packet to the base station on a timeslot and a frequency that are indicated by the time-frequency resource.

In this embodiment of the present invention, a specific implementation of the obtaining a size of the data packet corresponding to the time-frequency resource and obtaining a data transmission format corresponding to the size of the data packet is as follows:

obtaining, according to a preset correspondence between sizes of different data packets and time-frequency resources, the size of the data packet corresponding to the time-frequency resource;

obtaining, according to a preset correspondence between data packets of different sizes and data transmission formats, the data transmission format corresponding to the size of the data packet.

Data packets of different sizes separately correspond to different time-frequency resources, that is, a data packet of each size has a uniquely corresponding time-frequency resource. Therefore, after a time-frequency resource is obtained, a size of a data packet can be obtained, and then a data transmission format corresponding to the size of the data packet is obtained.

Further, in this embodiment of the present invention, the data transmission format includes a subcarrier interval used during transmission of the to-be-sent data packet, a quantity of OFDM symbols, and duration of a CP.

Before sending a data packet, the terminal modulates the data packet into several OFDM symbols according to a preset modulation scheme (for example, a QPSK modulation scheme), and sends these OFDM symbols by using a timeslot resource corresponding to the data packet, that is, sends these OFDM symbols on a corresponding timeslot and frequency (or a subcarrier, because one subcarrier corresponds to one section of continuous frequencies, a corresponding subcarrier may be determined according to a specific frequency).

Therefore, it can be understood that the subcarrier interval and a quantity of subcarriers define a transmission format in a frequency domain after the to-be-sent data packet is modulated into the OFDM symbols, where a preset subcarrier interval is an integer multiple of the subcarrier interval.

For example, the preset subcarrier interval may be a subcarrier interval in the existing LTE system, and the subcarrier interval in the existing LTE system is 15 KHZ.

In the data transmission format provided in this embodiment of the present invention, the subcarrier interval in the existing LTE system may be an integer multiple of the subcarrier interval provided in this embodiment of the present invention. Therefore, interference between a subcarrier used in this embodiment of the present invention and a subcarrier in the existing LTE system can be reduced effectively, and reliability of data transmission can be improved.

Similarly, it can be understood that the quantity of the OFDM symbols, the duration of the CP, duration of a single OFDM symbol, and duration of a GT together define a transmission format in a time domain after the to-be-sent data packet is modulated into the OFDM symbols.

For details of a schematic diagram of a transmission format in a time domain after a data packet is modulated into OFDM symbols according to this embodiment of the present invention, reference may be further made to FIG. 2, which specifically includes a CP, N OFDM symbols, and a GT.

A sum of duration of the CP, duration of the N OFDM symbols, and duration of the GT is an integer multiple of a preset transmission timeslot, where N represents a quantity of the OFDM symbols and is a positive integer.

For example, the preset transmission timeslot may be a timeslot in LTE. In LTE, one subframe of one data frame has duration of 1 millisecond (ms) in a time domain and includes two timeslots, and each timeslot is 500 microseconds (μs). Therefore, in this embodiment of the present invention, the sum of the duration of the CP, the duration of the N OFDM symbols, and the duration of the GT is an integer multiple of 500 μs.

A value of the CP is greater than or equal to a sum of a maximum multipath delay spread and a double of a propagation delay, and a value of the GT is greater than or equal to the double of the propagation delay.

Further, data packets of different sizes correspond to different data transmission formats.

In this embodiment of the present invention, the following two transmission formats are provided, so as to implement transmission of data packets of different sizes.

Specifically, a design method for the data transmission format is a first data transmission format design method or a second data transmission format design method, where a feature of a data transmission format obtained by using the first data transmission format design method is that a same subcarrier interval is used for data packets of different sizes and data packets of different sizes are transmitted by using different quantities of OFDM symbols.

For example, a same subcarrier interval is used for transmitting all data packets, and because a reciprocal of a subcarrier interval is OFDM symbol duration, it may be that same OFDM symbol duration is used for all data packets; and a data packet of a smaller size may be transmitted by using one OFDM symbol, and a data packet of a larger size may be transmitted by using two or more OFDM symbols.

For the data transmission format obtained by using the first data transmission format design method, reference may be made to the description related to Table 1.

A feature of a data transmission format obtained by using the second data transmission format design method is that a same quantity of OFDM symbols are used for data packets of different sizes and data packets of different sizes are transmitted by using different subcarrier intervals.

For example, all data packets are transmitted by using one OFDM symbol; and a data packet of a smaller size may be transmitted by using a larger subcarrier interval, and a data packet of a larger size may be transmitted by using a smaller subcarrier interval.

For the data transmission format obtained by using the second data transmission format design method, reference may be made to the description related to Table 2.

340: Receive the data packet on the time-frequency resource according to the data transmission format.

In this embodiment of the present invention, a terminal sends a to-be-sent data packet to a base station on a time-frequency resource according to a data transmission format, and the base station may receive the data packet. Compared with the prior art, in the present invention, the terminal does not need to perform a random access process before sending uplink data, and instead sends the uplink data directly to the base station on the time-frequency resource according to the obtained data transmission format; therefore, especially when the uplink data is a small data packet, a transmission delay during sending of the uplink data by the terminal can be reduced and transmission efficiency can be improved.

Figure 4:
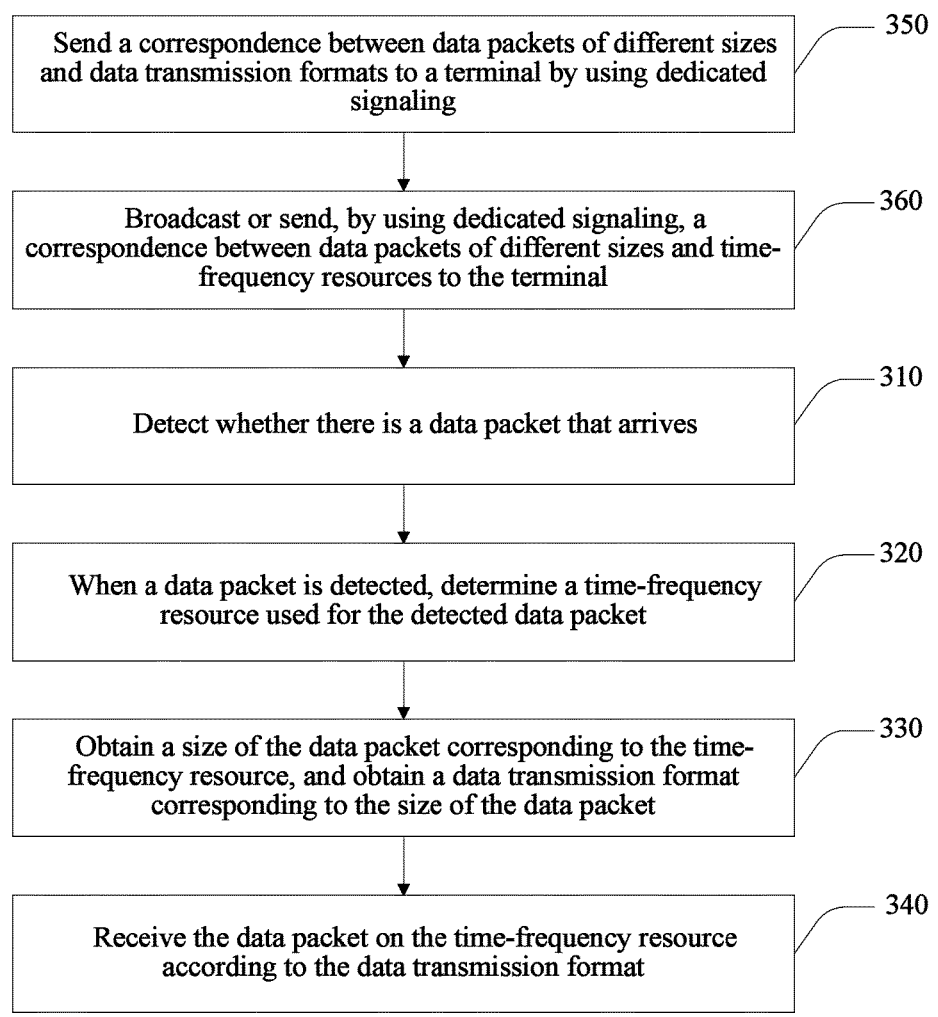
FIG. 4 is a flowchart of another uplink data receiving method according to an embodiment of the present invention.

Further, as shown in FIG. 4, the uplink data receiving method further includes:

350: Send a correspondence between data packets of different sizes and data transmission formats to a terminal by using dedicated signaling.

360: Broadcast or send, by using dedicated signaling, a correspondence between data packets of different sizes and time-frequency resources to the terminal.

It should be noted that steps 350 and 360 are performed before step 310, so that the terminal can directly transmit the uplink data after obtaining the correspondence between data packets of different sizes and data transmission formats and the correspondence between data packets of different sizes and time-frequency resources.

Figure 5:
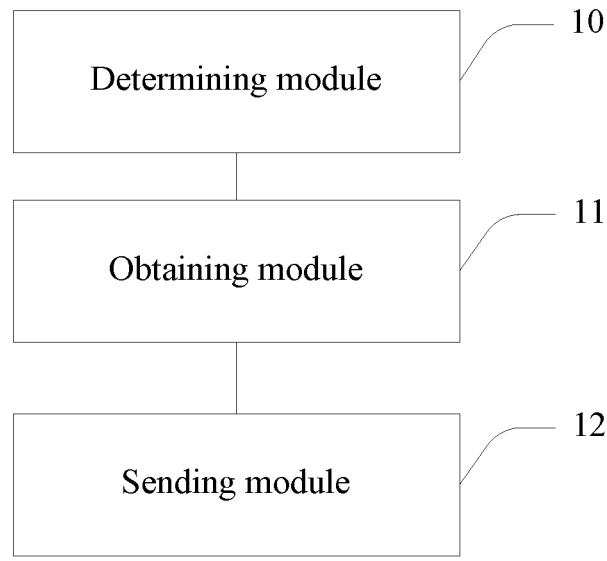
FIG. 5 is a first structural diagram of an uplink data sending apparatus according to an embodiment of the present invention.

As shown in FIG. 5, an embodiment of the present invention provides an uplink data sending apparatus. The apparatus may be a terminal, including a determining module 10, an obtaining module 11, and a sending module 12.

The determining module 10 is configured to determine a size of a to-be-sent data packet.

In this embodiment of the present invention, the to-be-sent data packet is a data packet having a small capacity. For example, the size of the to-be-sent data packet may be 20 bytes (byte), 30 bytes, 40 bytes, 50 bytes, or the like.

It should be noted that the to-be-sent data packet is a data packet of a pre-designed standard size. All data to be actually sent by the terminal needs to be sent by using a data packet of the standard size, where the data packet of the standard size may be a 20 bytes data packet, a 30 bytes data packet, a 40 bytes data packet, a 50 bytes data packet, or the like.

The obtaining module 11 is configured to obtain a time-frequency resource and a data transmission format that correspond to the size of the to-be-sent data packet.

The time-frequency resource is a timeslot resource and a frequency resource that are used during transmission of the to-be-sent data packet, and is pre-allocated by a base station and notified by the base station to the terminal. After obtaining the time-frequency resource, the terminal may send the to-be-sent data packet to the base station on a timeslot and a frequency that are indicated by the time-frequency resource.

Data packets of different sizes separately correspond to different time-frequency resources, that is, a data packet of each size has a uniquely corresponding time-frequency resource.

Further, in this embodiment of the present invention, the data transmission format includes a subcarrier interval used during transmission of the to-be-sent data packet, a quantity of OFDM symbols, and duration of a CP.

Before sending a data packet, the terminal modulates the data packet into several OFDM symbols according to a preset modulation scheme (for example, a QPSK modulation scheme), and sends these OFDM symbols by using a timeslot resource corresponding to the data packet, that is, sends these OFDM symbols on a corresponding timeslot and frequency (or a subcarrier, because one subcarrier corresponds to one section of continuous frequencies, a corresponding subcarrier may be determined according to a specific frequency).

Therefore, it can be understood that the subcarrier interval and a quantity of subcarriers define a transmission format in a frequency domain after the to-be-sent data packet is modulated into the OFDM symbols, where a preset subcarrier interval is an integer multiple of the subcarrier interval.

For example, the preset subcarrier interval may be a subcarrier interval in the existing LTE system, and the subcarrier interval in the existing LTE system is 15 KHZ.

In the data transmission format provided in this embodiment of the present invention, the subcarrier interval in the existing LTE system may be an integer multiple of the subcarrier interval provided in this embodiment of the present invention. Therefore, interference between a subcarrier used in this embodiment of the present invention and a subcarrier in the existing LTE system can be reduced effectively, and reliability of data transmission can be improved.

Similarly, it can be understood that the quantity of the OFDM symbols, the duration of the CP, duration of a single OFDM symbol, and duration of a GT together define a transmission format in a time domain after the to-be-sent data packet is modulated into the OFDM symbols.

For a schematic diagram of a transmission format in a time domain after a data packet is modulated into OFDM symbols according to this embodiment of the present invention, reference may be made to FIG. 2, which specifically includes a CP, N OFDM symbols, and a GT.

A sum of duration of the CP, duration of the N OFDM symbols, and duration of the GT is an integer multiple of a preset transmission timeslot, where N represents a quantity of the OFDM symbols and is a positive integer.

A value of the CP is greater than or equal to a sum of a maximum multipath delay spread and a double of a propagation delay, and a value of the GT is greater than or equal to the double of the propagation delay.

The sending module 12 is configured to send the to-be-sent data packet to a base station on the time-frequency resource according to the data transmission format.

For example, using an example in which the size of the to-be-sent data packet is 20 bytes, the terminal may modulate the 20 bytes data packet into 240 OFDM symbols by using the QPSK modulation scheme; using an example in which a transmission format corresponding to the 20 bytes data packet is the transmission format shown in row 1 of Table 1, one OFDM symbol is used; and if the time-frequency resource corresponding to the 20 bytes data packet is the second OFDM symbol of the first timeslot of the second subframe of the third data frame and 240 specified subcarriers, the terminal uses the 240 subcarriers (the subcarrier interval is 2.5 KHZ) to send the 240 OFDM symbols within duration of the second OFDM symbol of the first timeslot of the second subframe of the third data frame.

In this embodiment of the present invention, when sending uplink data, a terminal obtains a time-frequency resource and a data transmission format that correspond to a size of a to-be-sent data packet, and sends the to-be-sent data packet to a base station on the time-frequency resource according to the data transmission format. Compared with the prior art, in the present invention, the terminal does not need to perform a random access process before sending the uplink data, and instead sends the uplink data directly to the base station on the time-frequency resource according to the obtained data transmission format; therefore, especially when the uplink data is a small data packet, a transmission delay during sending of the uplink data by the terminal can be reduced and transmission efficiency can be improved.

Further, data packets of different sizes correspond to different data transmission formats. In this embodiment of the present invention, the following two transmission formats are provided, so as to implement transmission of data packets of different sizes.

Specifically, a design method for the data transmission format obtained by the obtaining module 11 is a first data transmission format design method or a second data transmission format design method, where a feature of a data transmission format obtained by using the first data transmission format design method is that a same subcarrier interval is used for data packets of different sizes and data packets of different sizes are transmitted by using different quantities of OFDM symbols.

For details of the data transmission format obtained by using the first data transmission format design method, reference may be made to the description related to Table 1.

A feature of a data transmission format obtained by using the second data transmission format design method is that a same quantity of OFDM symbols are used for data packets of different sizes and data packets of different sizes are transmitted by using different subcarrier intervals.

For details of the data transmission format obtained by using the second data transmission format design method, reference may be made to the description related to Table 2.

Further, in this embodiment of the present invention, optionally, the obtaining module 11 is specifically configured to obtain, according to a preset correspondence between data packets of different sizes and data transmission formats, the data transmission format corresponding to the size of the to-be-sent data packet;

or optionally, the obtaining module 11 is specifically configured to receive a correspondence between data packets of different sizes and data transmission formats that is sent by the base station by using dedicated signaling, and obtain, according to the received correspondence between data packets of different sizes and data transmission formats, the data transmission format corresponding to the size of the to-be-sent data packet.

Further, in this embodiment of the present invention, optionally, the obtaining module 11 may receive a correspondence between data packets of different sizes and time-frequency resources that is broadcast by the base station, and obtain, according to the received correspondence between data packets of different sizes and time-frequency resources, the time-frequency resource corresponding to the size of the to-be-sent data packet;

or optionally, the obtaining module 11 may receive a correspondence between data packets of different sizes and time-frequency resources that is sent by the base station by using dedicated signaling, and obtain, according to the received correspondence between data packets of different sizes and time-frequency resources, the time-frequency resource corresponding to the size of the to-be-sent data packet.

Figure 6:
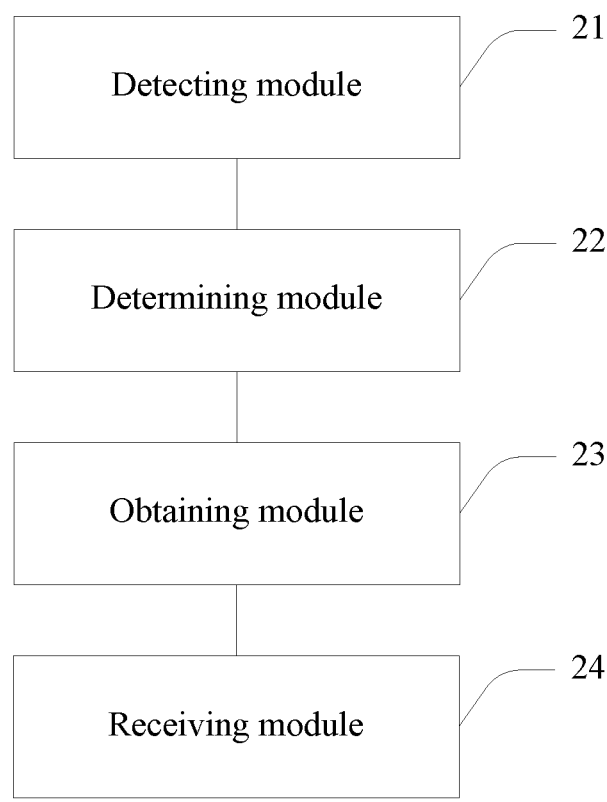
FIG. 6 is a first structural diagram of an uplink data receiving apparatus according to an embodiment of the present invention.

As shown in FIG. 6, an embodiment of the present invention further provides an uplink data receiving apparatus. The apparatus may be a base station, including a detecting module 21, a determining module 22, an obtaining module 23, and a receiving module 24, where the detecting module 21 is configured to detect whether there is a data packet that arrives;

the determining module 22 is configured to: when a data packet is detected, determine a time-frequency resource used for the detected data packet; and the obtaining module 23 is configured to obtain a size of the data packet corresponding to the time-frequency resource, and obtain a data transmission format corresponding to the size of the data packet.

The time-frequency resource is a timeslot resource and a frequency resource that are used during transmission of the to-be-sent data packet, and is pre-allocated by a base station and notified by the base station to the terminal. After obtaining the time-frequency resource, the terminal may send the to-be-sent data packet to the base station on a timeslot and a frequency that are indicated by the time-frequency resource.

Data packets of different sizes separately correspond to different time-frequency resources, that is, a data packet of each size has a uniquely corresponding time-frequency resource. Therefore, after a time-frequency resource is obtained, a size of a data packet can be obtained, and then a data transmission format corresponding to the size of the data packet is obtained.

Further, in this embodiment of the present invention, the data transmission format includes a subcarrier interval used during transmission of the to-be-sent data packet, a quantity of OFDM symbols, and duration of a CP.

Before sending a data packet, the terminal modulates the data packet into several OFDM symbols according to a preset modulation scheme (for example, a QPSK modulation scheme), and sends these OFDM symbols by using a timeslot resource corresponding to the data packet, that is, sends these OFDM symbols on a corresponding timeslot and frequency (or a subcarrier, because one subcarrier corresponds to one section of continuous frequencies, a corresponding subcarrier may be determined according to a specific frequency).

Therefore, it can be understood that the subcarrier interval and a quantity of subcarriers define a transmission format in a frequency domain after the to-be-sent data packet is modulated into the OFDM symbols, where a preset subcarrier interval is an integer multiple of the subcarrier interval.

For example, the preset subcarrier interval may be a subcarrier interval in the existing LTE system, and the subcarrier interval in the existing LTE system is 15 KHZ.

In the data transmission format provided in this embodiment of the present invention, the subcarrier interval in the existing LTE system may be an integer multiple of the subcarrier interval provided in this embodiment of the present invention. Therefore, interference between a subcarrier used in this embodiment of the present invention and a subcarrier in the existing LTE system can be reduced effectively, and reliability of data transmission can be improved.

Similarly, it can be understood that the quantity of the OFDM symbols, the duration of the CP, duration of a single OFDM symbol, and duration of a GT together define a transmission format in a time domain after the to-be-sent data packet is modulated into the OFDM symbols.

For details of a schematic diagram of a transmission format in a time domain after a data packet is modulated into OFDM symbols according to this embodiment of the present invention, reference may be further made to FIG. 2, which specifically includes a CP, N OFDM symbols, and a GT.

A sum of duration of the CP, duration of the N OFDM symbols, and duration of the GT is an integer multiple of a preset transmission timeslot, where N represents a quantity of the OFDM symbols and is a positive integer.

For example, the preset transmission timeslot may be a timeslot in LTE. In LTE, one subframe of one data frame has duration of 1 millisecond (ms) in a time domain and includes two timeslots, and each timeslot is 500 microseconds (μs). Therefore, in this embodiment of the present invention, the sum of the duration of the CP, the duration of the N OFDM symbols, and the duration of the GT is an integer multiple of 500 μs.

A value of the CP is greater than or equal to a sum of a maximum multipath delay spread and a double of a propagation delay, and a value of the GT is greater than or equal to the double of the propagation delay.

The receiving module 24 is configured to receive the data packet on the time-frequency resource according to the data transmission format.

In this embodiment of the present invention, a terminal sends a to-be-sent data packet to a base station on a time-frequency resource according to a data transmission format, and the base station may receive the data packet. Compared with the prior art, in the present invention, the terminal does not need to perform a random access process before sending uplink data, and instead sends the uplink data directly to the base station on the time-frequency resource according to the obtained data transmission format; therefore, especially when the uplink data is a small data packet, a transmission delay during sending of the uplink data by the terminal can be reduced and transmission efficiency can be improved.

Further, in this embodiment of the present invention, the obtaining module 23 is specifically configured to obtain, according to a preset correspondence between sizes of different data packets and time-frequency resources, the size of the data packet corresponding to the time-frequency resource; and the obtaining module 23 is specifically further configured to obtain, according to a preset correspondence between data packets of different sizes and data transmission formats, the data transmission format corresponding to the size of the data packet.

Further, data packets of different sizes correspond to different data transmission formats. In this embodiment of the present invention, the following two transmission formats are provided, so as to implement transmission of data packets of different sizes.

Specifically, a design method for the data transmission format is a first data transmission format design method or a second data transmission format design method, where a feature of a data transmission format obtained by using the first data transmission format design method is that a same subcarrier interval is used for data packets of different sizes and data packets of different sizes are transmitted by using different quantities of OFDM symbols.

For example, a same subcarrier interval is used for transmitting all data packets, and because a reciprocal of a subcarrier interval is OFDM symbol duration, it may be that same OFDM symbol duration is used for all data packets; and a data packet of a smaller size may be transmitted by using one OFDM symbol, and a data packet of a larger size may be transmitted by using two or more OFDM symbols.

For the data transmission format obtained by using the first data transmission format design method, reference may be made to the description related to Table 1.

A feature of a data transmission format obtained by using the second data transmission format design method is that a same quantity of OFDM symbols are used for data packets of different sizes and data packets of different sizes are transmitted by using different subcarrier intervals.

For example, all data packets are transmitted by using one OFDM symbol; and a data packet of a smaller size may be transmitted by using a larger subcarrier interval, and a data packet of a larger size may be transmitted by using a smaller subcarrier interval.

For the data transmission format obtained by using the second data transmission format design method, reference may be made to the description related to Table 2.

Figure 7:
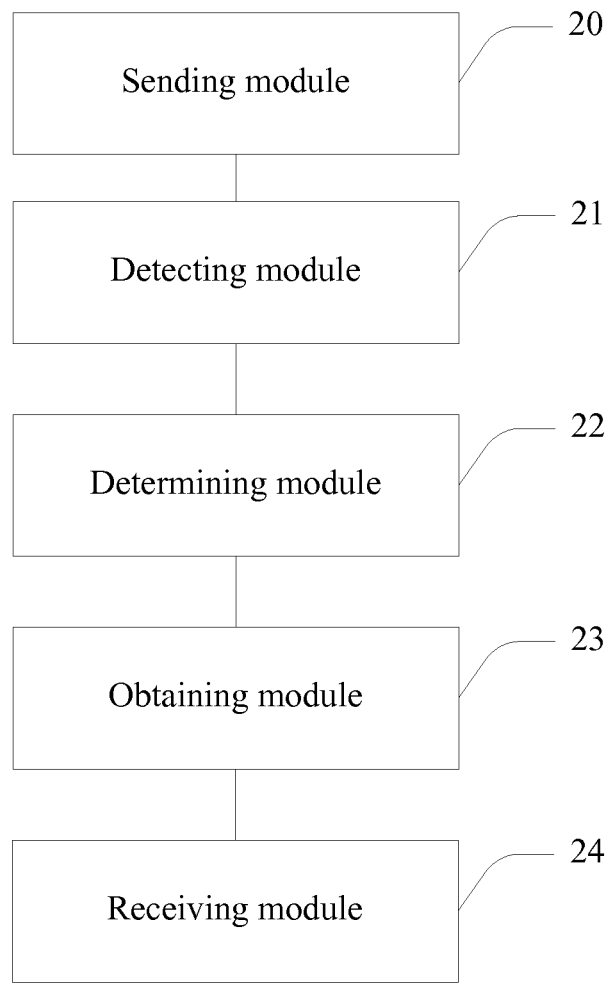
FIG. 7 is a second structural diagram of an uplink data receiving apparatus according to an embodiment of the present invention.

As shown in FIG. 7, the uplink data receiving apparatus further includes:

a sending module 20, configured to send a correspondence between data packets of different sizes and data transmission formats to a terminal by using dedicated signaling, where the sending module 20 is further configured to broadcast or send, by using dedicated signaling, a correspondence between data packets of different sizes and time-frequency resources to the terminal.

The sending module sends the correspondence between data packets of different sizes and data transmission formats and the correspondence between data packets of different sizes and time-frequency resources to the terminal, so that the terminal can directly transmit the uplink data after obtaining the correspondence between data packets of different sizes and data transmission formats and the correspondence between data packets of different sizes and time-frequency resources.

Figure 8:
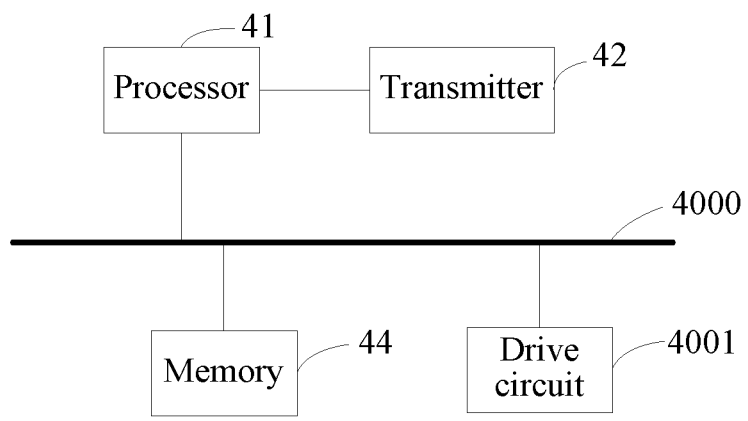
FIG. 8 is a second structural diagram of an uplink data sending apparatus according to an embodiment of the present invention.

As shown in FIG. 8, an embodiment of the present invention provides an uplink data sending apparatus. The apparatus may be a mobile terminal, including a processor 41, a transmitter 42, a memory 44, a bus system 4000, and a drive circuit 4001.

The processor 41 is configured to determine a size of a to-be-sent data packet.

In this embodiment of the present invention, the to-be-sent data packet is a data packet having a small capacity. For example, the size of the to-be-sent data packet may be 20 bytes (byte), 30 bytes, 40 bytes, 50 bytes, or the like.

It should be noted that the to-be-sent data packet is a data packet of a pre-designed standard size. All data to be actually sent by the terminal needs to be sent by using a data packet of the standard size, where the data packet of the standard size may be a 20 bytes data packet, a 30 bytes data packet, a 40 bytes data packet, a 50 bytes data packet, or the like.

The processor 41 is further configured to obtain a time-frequency resource and a data transmission format that correspond to the size of the to-be-sent data packet, where the data transmission format includes a subcarrier interval used during transmission of the to-be-sent data packet, a quantity of OFDM symbols, and duration of a CP, where a sum of the duration of the CP, duration of N OFDM symbols, and duration of a GT is an integer multiple of a preset transmission timeslot, where N represents the quantity of the OFDM symbols and is a positive integer, and a preset subcarrier interval is an integer multiple of the subcarrier interval.

The time-frequency resource is a timeslot resource and a frequency resource that are used during transmission of the to-be-sent data packet, and is pre-allocated by a base station and notified by the base station to the terminal. After obtaining the time-frequency resource, the terminal may send the to-be-sent data packet to the base station on a timeslot and a frequency that are indicated by the time-frequency resource.

Before sending a data packet, the terminal modulates the data packet into several OFDM symbols according to a preset modulation scheme (for example, a QPSK modulation scheme), and sends these OFDM symbols by using a timeslot resource corresponding to the data packet, that is, sends these OFDM symbols on a corresponding timeslot and frequency (or a subcarrier, because one subcarrier corresponds to one section of continuous frequencies, a corresponding subcarrier may be determined according to a specific frequency).

Therefore, it can be understood that the subcarrier interval and a quantity of subcarriers define a transmission format in a frequency domain after the to-be-sent data packet is modulated into the OFDM symbols, where a preset subcarrier interval is an integer multiple of the subcarrier interval.

For example, the preset subcarrier interval may be a subcarrier interval in the existing LTE system, and the subcarrier interval in the existing LTE system is 15 KHZ.

In the data transmission format provided in this embodiment of the present invention, the subcarrier interval in the existing LTE system may be an integer multiple of the subcarrier interval provided in this embodiment of the present invention. Therefore, interference between a subcarrier used in this embodiment of the present invention and a subcarrier in the existing LTE system can be reduced effectively, and reliability of data transmission can be improved.

Similarly, it can be understood that the quantity of the OFDM symbols, the duration of the CP, duration of a single OFDM symbol, and duration of a GT together define a transmission format in a time domain after the to-be-sent data packet is modulated into the OFDM symbols.

For a schematic diagram of a transmission format in a time domain after a data packet is modulated into OFDM symbols according to this embodiment of the present invention, reference may be made to FIG. 2, which specifically includes a CP, N OFDM symbols, and a GT.

A sum of duration of the CP, duration of the N OFDM symbols, and duration of the GT is an integer multiple of a preset transmission timeslot, where N represents a quantity of the OFDM symbols and is a positive integer.

A value of the CP is greater than or equal to a sum of a maximum multipath delay spread and a double of a propagation delay, and a value of the GT is greater than or equal to the double of the propagation delay.

The transmitter 42 is configured to send the to-be-sent data packet to a base station on the time-frequency resource according to the data transmission format.

For example, using an example in which the size of the to-be-sent data packet is 20 bytes, the terminal may modulate the 20 bytes data packet into 240 OFDM symbols by using the QPSK modulation scheme; using an example in which a transmission format corresponding to the 20 bytes data packet is the transmission format shown in row 1 of Table 1, one OFDM symbol is used; and if the time-frequency resource corresponding to the 20 bytes data packet is the second OFDM symbol of the first timeslot of the second subframe of the third data frame and 240 specified subcarriers, the transmitter uses the 240 subcarriers (the subcarrier interval is 2.5 KHZ) to send the 240 OFDM symbols within duration of the second OFDM symbol of the first timeslot of the second subframe of the third data frame.

In a specific implementation of this embodiment, the memory 44 includes at least one or more of the following memory devices: a read-only memory, a random access memory, and a nonvolatile random access memory. The memory provides an instruction and data for the processor.

The processor 41 may be an integrated circuit chip having a signal processing capability. In an implementation process, the steps of the foregoing method may be implemented by using a hardware integrated logic circuit in the processor or instructions in a form of software. These instructions may be implemented and controlled in cooperation with the processor, and are used to execute the method disclosed in the embodiments of the present invention. The processor may also be a general purpose processor, a digital signal processor (DSP), an application specific integrated circuit, a field programmable gate array (FPGA), or other programmable logic devices, discrete gate or transistor logic devices, and discrete hardware components.

The general purpose processor may be a microprocessor, or the processor may be any conventional processor, decoder, or the like. The steps of the method disclosed in combination with the embodiments of the present invention may be directly performed by a hardware processor, or may be performed by using a combination of hardware in the processor and a software module. The software module may be located in a mature storage medium in the art such as a random access memory, a flash memory, a read-only memory, a programmable read-only memory, an electrically erasable programmable read-only memory, or a register.

The drive circuit 4001 is configured to drive hardware in the uplink data receiving apparatus, so that the hardware can work normally.

In addition, hardware components of the uplink data receiving apparatus are coupled together by using the bus system 4000. Besides a data bus, the bus system 4000 further includes a power bus, a control bus, and a status signal bus. However, for clear description, in FIG. 8, the various buses are all marked as the bus system 4000.

In this embodiment of the present invention, when sending uplink data, a terminal obtains a time-frequency resource and a data transmission format that correspond to a size of a to-be-sent data packet, and sends the to-be-sent data packet to a base station on the time-frequency resource according to the data transmission format. Compared with the prior art, in the present invention, the terminal does not need to perform a random access process before sending the uplink data, and instead sends the uplink data directly to the base station on the time-frequency resource according to the obtained data transmission format; therefore, especially when the uplink data is a small data packet, a transmission delay during sending of the uplink data by the terminal can be reduced and transmission efficiency can be improved.

Further, data packets of different sizes correspond to different data transmission formats. In this embodiment of the present invention, a design method for the data transmission format obtained by the processor is a first data transmission format design method or a second data transmission format design method, where a feature of a data transmission format obtained by using the first data transmission format design method is that a same subcarrier interval is used for data packets of different sizes and data packets of different sizes are transmitted by using different quantities of OFDM symbols.

For details of the data transmission format obtained by using the first data transmission format design method, reference may be made to the description related to Table 1.

A feature of a data transmission format obtained by using the second data transmission format design method is that a same quantity of OFDM symbols are used for data packets of different sizes and data packets of different sizes are transmitted by using different subcarrier intervals.

For details of the data transmission format obtained by using the second data transmission format design method, reference may be made to the description related to Table 2.

Figure 9:
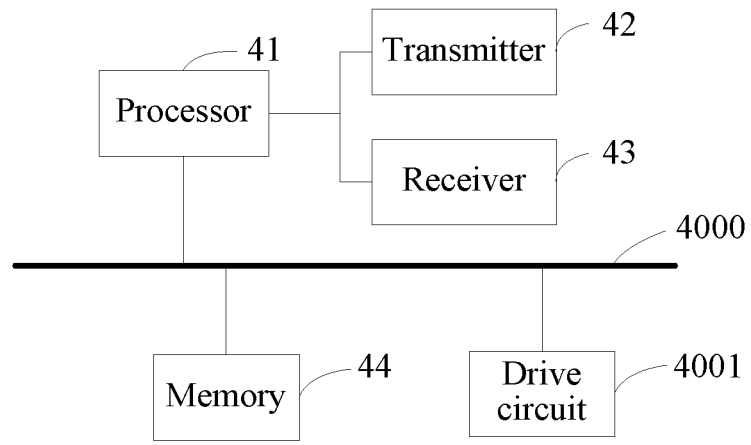
FIG. 9 is a third structural diagram of an uplink data sending apparatus according to an embodiment of the present invention.

Further, in this embodiment of the present invention, the processor 41 is specifically configured to obtain, according to a preset correspondence between data packets of different sizes and data transmission formats, the data transmission format corresponding to the size of the to-be-sent data packet;

or as shown in FIG. 9, the apparatus further includes a receiver 43, configured to receive a correspondence between data packets of different sizes and data transmission formats that is sent by the base station by using dedicated signaling, where the processor 41 is specifically configured to obtain, according to the correspondence between data packets of different sizes and data transmission formats that is received by the receiver, the data transmission format corresponding to the size of the to-be-sent data packet.

Further, in this embodiment of the present invention, optionally, as shown in FIG. 9, the receiver 43 is configured to receive a correspondence between data packets of different sizes and time-frequency resources that is broadcast by the base station, and the processor 41 is specifically configured to obtain, according to the received correspondence between data packets of different sizes and time-frequency resources, the time-frequency resource corresponding to the size of the to-be-sent data packet;

or the receiver 43 is specifically configured to receive a correspondence between data packets of different sizes and time-frequency resources that is sent by the base station by using dedicated signaling, and the processor 41 is specifically configured to obtain, according to the received correspondence between data packets of different sizes and time-frequency resources, the time-frequency resource corresponding to the size of the to-be-sent data packet.

Figure 10:
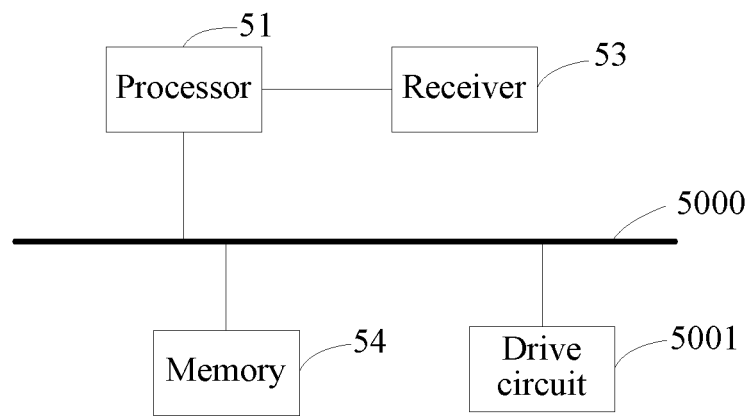
FIG. 10 is a third structural diagram of an uplink data receiving apparatus according to an embodiment of the present invention.

As shown in FIG. 10, an embodiment of the present invention provides an uplink data receiving apparatus, including a processor 51, a receiver 53, a memory 54, a bus system 5000, and a drive circuit 5001, where the processor 51 is configured to detect whether there is a data packet that arrives; and the processor 51 is further configured to: when a data packet is detected, determine a time-frequency resource used for the detected data packet.

The time-frequency resource is a timeslot resource and a frequency resource that are used during transmission of the to-be-sent data packet, and is pre-allocated by a base station and notified by the base station to the terminal. After obtaining the time-frequency resource, the terminal may send the to-be-sent data packet to the base station on a timeslot and a frequency that are indicated by the time-frequency resource.

The processor 51 is further configured to obtain a size of the data packet corresponding to the time-frequency resource, and obtain a data transmission format corresponding to the size of the data packet, where the data transmission format includes a subcarrier interval used during transmission of the to-be-sent data packet, a quantity of OFDM symbols, and duration of a CP, where a sum of the duration of the CP, duration of N OFDM symbols, and duration of a GT is an integer multiple of a preset transmission timeslot, where N represents the quantity of the OFDM symbols and is a positive integer, and a preset subcarrier interval is an integer multiple of the subcarrier interval.

Data packets of different sizes separately correspond to different time-frequency resources, that is, a data packet of each size has a uniquely corresponding time-frequency resource. Therefore, after a time-frequency resource is obtained, a size of a data packet can be obtained, and then a data transmission format corresponding to the size of the data packet is obtained.

Further, in this embodiment of the present invention, the data transmission format includes a subcarrier interval used during transmission of the to-be-sent data packet, a quantity of OFDM symbols, and duration of a CP.

Before sending a data packet, the terminal modulates the data packet into several OFDM symbols according to a preset modulation scheme (for example, a QPSK modulation scheme), and sends these OFDM symbols by using a timeslot resource corresponding to the data packet, that is, sends these OFDM symbols on a corresponding timeslot and frequency (or a subcarrier, because one subcarrier corresponds to one section of continuous frequencies, a corresponding subcarrier may be determined according to a specific frequency).

Therefore, it can be understood that the subcarrier interval and a quantity of subcarriers define a transmission format in a frequency domain after the to-be-sent data packet is modulated into the OFDM symbols, where a preset subcarrier interval is an integer multiple of the subcarrier interval.

For example, the preset subcarrier interval may be a subcarrier interval in the existing LTE system, and the subcarrier interval in the existing LTE system is 15 KHZ.

In the data transmission format provided in this embodiment of the present invention, the subcarrier interval in the existing LTE system may be an integer multiple of the subcarrier interval provided in this embodiment of the present invention. Therefore, interference between a subcarrier used in this embodiment of the present invention and a subcarrier in the existing LTE system can be reduced effectively, and reliability of data transmission can be improved.

Similarly, it can be understood that the quantity of the OFDM symbols, the duration of the CP, duration of a single OFDM symbol, and duration of a GT together define a transmission format in a time domain after the to-be-sent data packet is modulated into the OFDM symbols.

For details of a schematic diagram of a transmission format in a time domain after a data packet is modulated into OFDM symbols according to this embodiment of the present invention, reference may be further made to FIG. 2, which specifically includes a CP, N OFDM symbols, and a GT.

A sum of duration of the CP, duration of the N OFDM symbols, and duration of the GT is an integer multiple of a preset transmission timeslot, where N represents a quantity of the OFDM symbols and is a positive integer.

For example, the preset transmission timeslot may be a timeslot in LTE. In LTE, one subframe of one data frame has duration of 1 millisecond (ms) in a time domain and includes two timeslots, and each timeslot is 500 microseconds (µs). Therefore, in this embodiment of the present invention, the sum of the duration of the CP, the duration of the N OFDM symbols, and the duration of the GT is an integer multiple of 500 µs.

A value of the CP is greater than or equal to a sum of a maximum multipath delay spread and a double of a propagation delay, and a value of the GT is greater than or equal to the double of the propagation delay.

The receiver 52 is configured to receive the data packet on the time-frequency resource according to the data transmission format.

In a specific implementation of this embodiment, the memory 54 includes at least one or more of the following memory devices: a read-only memory, a random access memory, and a nonvolatile random access memory. The memory provides an instruction and data for the processor.

The processor 51 may be an integrated circuit chip having a signal processing capability. In an implementation process, the steps of the foregoing method may be implemented by using a hardware integrated logic circuit in the processor or instructions in a form of software. These instructions may be implemented and controlled in cooperation with the processor, and are used to execute the method disclosed in the embodiments of the present invention. The processor may also be a general purpose processor, a digital signal processor (DSP), an application specific integrated circuit, a field programmable gate array (FPGA), or other programmable logic devices, discrete gate or transistor logic devices, and discrete hardware components.

The general purpose processor may be a microprocessor, or the processor may be any conventional processor, decoder, or the like. The steps of the method disclosed in combination with the embodiments of the present invention may be directly performed by a hardware processor, or may be performed by using a combination of hardware in the processor and a software module. The software module may be located in a mature storage medium in the art such as a random access memory, a flash memory, a read-only memory, a programmable read-only memory, an electrically erasable programmable read-only memory, or a register.

The drive circuit 5001 is configured to drive hardware in the uplink data receiving apparatus, so that the hardware can work normally.

In addition, hardware components of the uplink data receiving apparatus are coupled together by using the bus system 5000. Besides a data bus, the bus system 5000 further includes a power bus, a control bus, and a status signal bus. However, for clear description, in FIG. 10, the various buses are all marked as the bus system 5000.

In this embodiment of the present invention, a terminal sends a to-be-sent data packet to a base station on a time-frequency resource according to a data transmission format, and the base station may receive the data packet. Compared with the prior art, in the present invention, the terminal does not need to perform a random access process before sending uplink data, and instead sends the uplink data directly to the base station on the time-frequency resource according to the obtained data transmission format; therefore, especially when the uplink data is a small data packet, a transmission delay during sending of the uplink data by the terminal can be reduced and transmission efficiency can be improved.

Further, data packets of different sizes correspond to different data transmission formats. In this embodiment of the present invention, the following two transmission formats are provided, so as to implement transmission of data packets of different sizes.

Specifically, a design method for the data transmission format is a first data transmission format design method or a second data transmission format design method,
where
a feature of a data transmission format obtained by using the first data transmission format design method is that a same subcarrier interval is used for data packets of different sizes and data packets of different sizes are transmitted by using different quantities of OFDM symbols.

For the data transmission format obtained by using the first data transmission format design method, reference may be made to the description related to Table 1.

A feature of a data transmission format obtained by using the second data transmission format design method is that a same quantity of OFDM symbols are used for data packets of different sizes and data packets of different sizes are transmitted by using different subcarrier intervals.

For the data transmission format obtained by using the second data transmission format design method, reference may be made to the description related to Table 2.

Further, the processor 51 is specifically configured to obtain, according to a preset correspondence between sizes of different data packets and time-frequency resources, the size of the data packet corresponding to the time-frequency resource; and the processor 51 is specifically further configured to obtain, according to a preset correspondence between data packets of different sizes and data transmission formats, the data transmission format corresponding to the size of the data packet.

Figure 11:
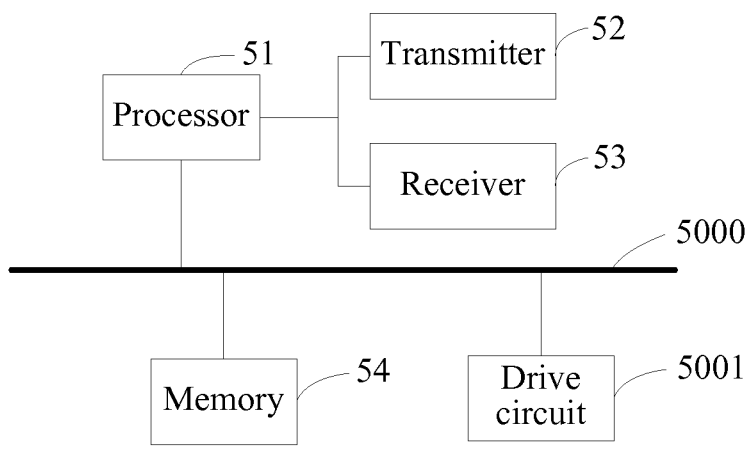
FIG. 11 is a fourth structural diagram of an uplink data receiving apparatus according to an embodiment of the present invention.

As shown in FIG. 11, the uplink data receiving apparatus further includes:
a transmitter 52, configured to send a correspondence between data packets of different sizes and data transmission formats to a terminal by using dedicated signaling, where
the transmitter 52 is further configured to broadcast or send, by using dedicated signaling, a correspondence between data packets of different sizes and time-frequency resources to the terminal.

The transmitter sends the correspondence between data packets of different sizes and data transmission formats and the correspondence between data packets of different sizes and time-frequency resources to the terminal, so that the terminal can directly transmit the uplink data after obtaining the correspondence between data packets of different sizes and data transmission formats and the correspondence between data packets of different sizes and time-frequency resources.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation.

For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. An uplink data sending method, comprising:
   determining a size of a to-be-sent data packet;
   obtaining a time-frequency resource and a data transmission format that correspond to the size of the to-be-sent data packet, wherein the data transmission format comprises a subcarrier interval used during transmission of the to-be-sent data packet, a quantity of orthogonal frequency division multiplexing (OFDM) symbols, and duration of a cyclic prefix (CP),
   wherein
   for a first size of the to-be-sent data packet, a sum of the duration of the CP, duration of N OFDM symbols, and duration of a guard time (GT) is a first integer multiple of a duration of a preset transmission timeslot,
   for a second size of the to-be-sent data packet, greater than the first size, the sum of the duration of the CP, duration of 2*N OFDM symbols, and duration of the GT is a second integer multiple of the duration of the preset transmission timeslot, greater than the first integer multiple,
   N represents the quantity of the OFDM symbols and is a positive integer,
   a preset subcarrier interval is an integer multiple of the subcarrier interval, and
   a duration of each OFDM symbol among the OFDM symbols is a reciprocal of the preset subcarrier interval; and
   sending the to-be-sent data packet to a base station on the time-frequency resource according to the data transmission format.

2. The uplink data sending method according to claim 1, wherein
   a design method for the data transmission format is a first data transmission format design method or a second data transmission format design method, wherein
   a feature of a data transmission format obtained by using the first data transmission format design method is that a same subcarrier interval is used for data packets of different sizes and data packets of different sizes are transmitted by using different quantities of OFDM symbols; and
   a feature of a data transmission format obtained by using the second data transmission format design method is that a same quantity of OFDM symbols are used for data packets of different sizes and data packets of different sizes are transmitted by using different subcarrier intervals.

3. The uplink data sending method according to claim 1, wherein the obtaining a data transmission format corresponding to the size of the to-be-sent data packet comprises:
   obtaining, according to a preset correspondence between data packets of different sizes and data transmission formats, the data transmission format corresponding to the size of the to-be-sent data packet;
   or
   receiving a correspondence between data packets of different sizes and data transmission formats that is sent by the base station by using dedicated signaling, and obtaining, according to the received correspondence between data packets of different sizes and data transmission formats, the data transmission format corresponding to the size of the to-be-sent data packet.

4. The uplink data sending method according to claim 1, wherein the obtaining a time-frequency resource corresponding to the size of the to-be-sent data packet comprises:
   receiving a correspondence between data packets of different sizes and time-frequency resources that is broadcast by the base station, and obtaining, according to the received correspondence between data packets of different sizes and time-frequency resources, the time-frequency resource corresponding to the size of the to-be-sent data packet;
   or
   receiving a correspondence between data packets of different sizes and time-frequency resources that is sent by the base station by using dedicated signaling, and obtaining, according to the received correspondence between data packets of different sizes and time-frequency resources, the time-frequency resource corresponding to the size of the to-be-sent data packet.

5. The uplink data sending method according to claim 1, wherein
   for a third size of the to-be-sent data packet, greater than the first size, the sum of the duration of the CP, duration of N OFDM symbols, and duration of the GT is the first integer multiple of the duration of the preset transmission timeslot, and
   the data packet of the third size is transmitted by using a smaller subcarrier interval than the subcarrier interval used to transmit the data packet of the first size.

6. The uplink data sending method according to claim 1, wherein a duration of a subframe which includes the preset transmission timeslot is an integer multiple of the duration of the preset transmission timeslot, the duration of the subframe being greater than the duration of the preset transmission timeslot.

7. The uplink data sending method according to claim 6, wherein the duration of the preset transmission timeslot is 500 microseconds.

8. An uplink data receiving method, comprising:
   detecting whether a data packet arrives;
   when a data packet is detected, determining a time-frequency resource used for the detected data packet;
   obtaining a size of the data packet corresponding to the time-frequency resource, and obtaining a data transmission format corresponding to the size of the data packet,
   wherein
   the data transmission format comprises a subcarrier interval used during transmission of the to-be-sent data packet, a quantity of OFDM symbols, and duration of a CP,
   for a first size of the data packet, a sum of the duration of the CP, duration of N OFDM symbols, and duration of a GT is a first integer multiple of a duration of a preset transmission timeslot, for a second size of the data packet, greater than the first size, the sum of the duration of the CP, duration of 2*N OFDM symbols, and duration of the GT is a second integer multiple of the duration of the preset transmission timeslot, greater than the first integer multiple, N represents the quantity of the OFDM symbols and is a positive integer, and a preset subcarrier interval is an integer multiple of the subcarrier interval, and a duration of each OFDM symbol among the OFDM symbols is a reciprocal of the preset subcarrier interval; and receiving the data packet on the time-frequency resource according to the data transmission format.

9. The uplink data receiving method according to claim 8, wherein a design method for the data transmission format is a first data transmission format design method or a second data transmission format design method, wherein a feature of a data transmission format obtained by using the first data transmission format design method is that a same subcarrier interval is used for data packets of different sizes and data packets of different sizes are transmitted by using different quantities of OFDM symbols; and a feature of a data transmission format obtained by using the second data transmission format design method is that a same quantity of OFDM symbols are used for data packets of different sizes and data packets of different sizes are transmitted by using different subcarrier intervals.

10. The uplink data receiving method according to claim 8, wherein the obtaining a size of the data packet corresponding to the time-frequency resource, and obtaining a data transmission format corresponding to the size of the data packet comprises:

obtaining, according to a preset correspondence between sizes of different data packets and time-frequency resources, the size of the data packet corresponding to the time-frequency resource; and obtaining, according to a preset correspondence between data packets of different sizes and data transmission formats, the data transmission format corresponding to the size of the data packet.

11. The uplink data receiving method according to claim 8, further comprising:

sending a correspondence between data packets of different sizes and data transmission formats to a terminal by using dedicated signaling; and broadcasting or sending, by using dedicated signaling, a correspondence between data packets of different sizes and time-frequency resources to the terminal.

12. An uplink data sending apparatus, comprising:

a processor, configured to determine a size of a to-be-sent data packet, wherein the processor is further configured to obtain a time-frequency resource and a data transmission format that correspond to the size of the to-be-sent data packet, wherein the data transmission format comprises a subcarrier interval used during transmission of the to-be-sent data packet, a quantity of OFDM symbols, and duration of a CP, for a first size of the to-be-sent data packet, a sum of the duration of the CP, duration of N OFDM symbols, and duration of a GT is a first integer multiple of a duration of a preset transmission timeslot, for a second size of the to-be-sent data packet, greater than the first size, the sum of the duration of the CP, duration of 2*N OFDM symbols, and duration of the GT is a second integer multiple of the duration of the preset transmission timeslot, greater than the first integer multiple, N represents the quantity of the OFDM symbols and is a positive integer, a preset subcarrier interval is an integer multiple of the subcarrier interval, and a duration of each OFDM symbol among the OFDM symbols is a reciprocal of the preset subcarrier interval; and a transmitter, configured to send the to-be-sent data packet to a base station on the time-frequency resource according to the data transmission format.

13. The uplink data sending apparatus according to claim 12, wherein a design method for the data transmission format obtained by the processor is a first data transmission format design method or a second data transmission format design method, wherein a feature of a data transmission format obtained by using the first data transmission format design method is that a same subcarrier interval is used for data packets of different sizes and data packets of different sizes are transmitted by using different quantities of OFDM symbols; and a feature of a data transmission format obtained by using the second data transmission format design method is that a same quantity of OFDM symbols are used for data packets of different sizes and data packets of different sizes are transmitted by using different subcarrier intervals.

14. The uplink data sending apparatus according to claim 12, wherein the processor is configured to obtain, according to a preset correspondence between data packets of different sizes and data transmission formats, the data transmission format corresponding to the size of the to-be-sent data packet;

or the apparatus further comprises: a receiver, configured to receive a correspondence between data packets of different sizes and data transmission formats that is sent by the base station by using dedicated signaling, wherein the processor is configured to obtain, according to the correspondence between data packets of different sizes and data transmission formats that is received by the receiver, the data transmission format corresponding to the size of the to-be-sent data packet.

15. The uplink data sending apparatus according to claim 12, further comprising:

a receiver, configured to receive a correspondence between data packets of different sizes and time-frequency resources that is broadcast by the base station, wherein the processor is configured to obtain, according to the received correspondence between data packets of different sizes and time-frequency resources, the time-frequency resource corresponding to the size of the to-be-sent data packet;

or the receiver, configured to receive a correspondence between data packets of different sizes and time-frequency resources that is sent by the base station by using dedicated signaling, wherein the processor is configured to obtain, according to the received correspondence between data packets of different sizes and time-frequency resources, the time-frequency resource corresponding to the size of the to-be-sent data packet.

16. An uplink data receiving apparatus, comprising:
a processor, configured to detect whether there is a data packet that arrives, wherein
the processor is further configured to: when a data packet is detected, determine a time-frequency resource used for the detected data packet; and
the processor is further configured to obtain a size of the data packet corresponding to the time-frequency resource, and obtain a data transmission format corresponding to the size of the data packet,
wherein
the data transmission format comprises a subcarrier interval used during transmission of the to-be-sent data packet, a quantity of OFDM symbols, and duration of a CP,
for a first size of the data packet, a sum of the duration of the CP, duration of N OFDM symbols, and duration of a GT is a first integer multiple of a duration of a preset transmission timeslot,
for a second size of the data packet, greater than the first size, the sum of the duration of the CP, duration of 2*N OFDM symbols, and duration of the GT is a second integer multiple of the duration of the preset transmission timeslot, greater than the first integer multiple,
N represents the quantity of the OFDM symbols and is a positive integer, and a preset subcarrier interval is an integer multiple of the subcarrier interval, and
a duration of each OFDM symbol among the OFDM symbols is a reciprocal of the preset subcarrier interval; and
a receiver, configured to receive the data packet on the time-frequency resource according to the data transmission format.

17. The uplink data receiving apparatus according to claim 16, wherein
a design method for the data transmission format is a first data transmission format design method or a second data transmission format design method,
wherein
a feature of a data transmission format obtained by using the first data transmission format design method is that a same subcarrier interval is used for data packets of different sizes and data packets of different sizes are transmitted by using different quantities of OFDM symbols; and
a feature of a data transmission format obtained by using the second data transmission format design method is that a same quantity of OFDM symbols are used for data packets of different sizes and data packets of different sizes are transmitted by using different subcarrier intervals.

18. The uplink data receiving apparatus according to claim 16, wherein
the processor is configured to obtain, according to a preset correspondence between sizes of different data packets and time-frequency resources, the size of the data packet corresponding to the time-frequency resource; and
the processor is further configured to obtain, according to a preset correspondence between data packets of different sizes and data transmission formats, the data transmission format corresponding to the size of the data packet.

19. The uplink data receiving apparatus according to claim 16, further comprising:
a transmitter, configured to send a correspondence between data packets of different sizes and data transmission formats to a terminal by using dedicated signaling, wherein
the transmitter is further configured to broadcast or send, by using dedicated signaling, a correspondence between data packets of different sizes and time-frequency resources to the terminal.

* * * * *